US012345533B2

(12) United States Patent
Lindberg (10) Patent No.: US 12,345,533 B2
(45) Date of Patent: Jul. 1, 2025

(54) ESTIMATION OF ACCIDENT INTENSITY FOR VEHICLES

(71) Applicant: ZENSEACT AB, Gothenburg (SE)

(72) Inventor: Carl Lindberg, Västra Frölunda (SE)

(73) Assignee: Zenseact AB, Gothenburg (SE)

( * ) Notice: Subject to any disclaimer, the term of this patent is extended or adjusted under 35 U.S.C. 154(b) by 364 days.

(21) Appl. No.: 17/852,533

(22) Filed: Jun. 29, 2022

(65) Prior Publication Data

US 2023/0005372 A1    Jan. 5, 2023

(30) Foreign Application Priority Data

Jul. 1, 2021   (EP) .................................... 21183230

(51) Int. Cl.
*B60W 50/00*   (2006.01)
*B60W 50/14*   (2020.01)
(Continued)

(52) U.S. Cl.
CPC ..... *G01C 21/3415* (2013.01); *B60W 50/0097* (2013.01); *B60W 50/14* (2013.01);
(Continued)

(58) Field of Classification Search
CPC ............. B60W 50/0097; B60W 50/14; G08G 1/0129; G08G 1/096725
See application file for complete search history.

(56) References Cited

U.S. PATENT DOCUMENTS 5,798,949 A * 8/1998 Kaub ................... G08G 1/0104
708/101

6,429,789 B1 * 8/2002 Kiridena .............. G08G 1/0962
340/936
(Continued)

FOREIGN PATENT DOCUMENTS

CN        103544850 A  *  1/2014
CN        112435469 A  *  3/2021   ........... G08G 1/0104
(Continued)

OTHER PUBLICATIONS

"Data Authorisation and Validation in Autonomous Vehicles: A Critical Review;" Alhabib et al., ARXIV ID: 2405. 17435; Apr. 10, 2024. (Year: 2024).*

(Continued)

*Primary Examiner* — Khoi H Tran
*Assistant Examiner* — Jorge O Peche
(74) *Attorney, Agent, or Firm* — Sage Patent Group (57) ABSTRACT

The present invention relates to a method for alerting drivers and/or autonomous vehicles of high risk scenarios. The method includes obtaining positional data of a vehicle, where the positional data is indicative of geographical position and heading of the vehicle. The method further includes obtaining environmental data of the vehicle, where the environmental data is indicative of state of the surrounding environment of the vehicle. The method includes determining, by means of trained model, accident intensity for upcoming road portion for the vehicle, the trained model being configured to determine accident intensity associated with the upcoming road portion based on the obtained environmental data and the obtained positional data. Then, if the determined accident intensity exceeds threshold, the method comprises transmitting signal indicating approaching high risk scenario to a Human-Machine-Interface, HMI, of the vehicle and/or to a control system of the vehicle.

9 Claims, 5 Drawing Sheets

US 12,345,533 B2

Page 2

(51) Int. Cl.
*G01C 21/34* (2006.01)
*G01C 21/36* (2006.01)
*G08G 1/01* (2006.01)
*G08G 1/0967* (2006.01)

(52) U.S. Cl.
CPC ....... *G01C 21/3691* (2013.01); *G08G 1/0129* (2013.01); *G08G 1/096725* (2013.01)

(56) References Cited

U.S. PATENT DOCUMENTS

| | | | |
|---|---|---|---|
| 6,662,141 B2* | 12/2003 | Kaub | G08G 1/0104 |
| | | | 702/181 |
| 8,583,341 B2* | 11/2013 | Stahlin | G08G 1/096725 |
| | | | 701/75 |
| 8,626,432 B2* | 1/2014 | Nishiyama | B60W 50/14 |
| | | | 340/436 |
| 9,174,641 B2* | 11/2015 | Fritz | B60W 30/0956 |
| 9,656,606 B1* | 5/2017 | Vose | G01S 19/42 |
| 9,718,468 B2* | 8/2017 | Barfield, Jr. | G08G 1/16 |
| 9,855,949 B2* | 1/2018 | Tomatsu | B60W 30/146 |
| 9,928,432 B1* | 3/2018 | Sathyanarayana | G05D 1/0055 |
| 10,157,422 B2* | 12/2018 | Jordan Peters | G06Q 30/0207 |
| 10,166,916 B2* | 1/2019 | Bernico | G08G 1/096716 |
| 10,235,882 B1* | 3/2019 | Aoude | G08G 1/164 |
| 10,417,914 B1* | 9/2019 | Vose | G05D 1/0278 |
| 10,486,692 B2* | 11/2019 | Nishimura | B60W 50/14 |
| 10,553,115 B1* | 2/2020 | Ismaili | G08G 1/0967 |
| 10,733,460 B2* | 8/2020 | Heck | G06V 20/58 |
| 2002/0082806 A1* | 6/2002 | Kaub | G08G 1/164 |
| | | | 702/182 |
| 2003/0033394 A1* | 2/2003 | Stine | H04L 47/24 |
| | | | 709/222 |
| 2005/0187713 A1* | 8/2005 | Yamamura | G08G 1/167 |
| | | | 701/301 |
| 2005/0192727 A1* | 9/2005 | Shostak | G07C 5/0808 |
| | | | 701/1 |
| 2006/0115122 A1* | 6/2006 | Nagaoka | G06T 7/215 |
| | | | 382/104 |
| 2006/0126896 A1* | 6/2006 | Nagaoka | G01S 17/931 |
| | | | 348/148 |
| 2006/0129292 A1* | 6/2006 | Ohkubo | B60W 50/14 |
| | | | 701/38 |
| 2006/0212194 A1* | 9/2006 | Breed | G07C 5/008 |
| | | | 701/1 |
| 2007/0003162 A1* | 1/2007 | Miyoshi | G06T 15/20 |
| | | | 382/276 |
| 2007/0046449 A1* | 3/2007 | Koike | B60T 7/22 |
| | | | 340/435 |
| 2007/0080968 A1* | 4/2007 | Kogure | G08G 1/166 |
| | | | 345/474 |
| 2007/0225882 A1* | 9/2007 | Yamaguchi | B60W 50/14 |
| | | | 701/45 |
| 2009/0143951 A1* | 6/2009 | Takahashi | B60W 30/09 |
| | | | 701/70 |
| 2010/0020170 A1* | 1/2010 | Higgins-Luthman | G06V 20/56 |
| | | | 348/135 |
| 2010/0198491 A1* | 8/2010 | Mays | B60W 50/0097 |
| | | | 701/31.4 |
| 2010/0214087 A1* | 8/2010 | Nakagoshi | B60W 40/09 |
| | | | 340/436 |
| 2011/0001617 A1* | 1/2011 | Roelke | B60W 30/08 |
| | | | 340/439 |
| 2011/0022247 A1* | 1/2011 | Stahlin | G08G 1/167 |
| | | | 701/1 |
| 2011/0077028 A1* | 3/2011 | Wilkes, III | G08G 1/052 |
| | | | 455/456.3 |
| 2014/0058761 A1* | 2/2014 | Freiberger | G06Q 10/0639 |
| | | | 705/4 |
| 2014/0222289 A1* | 8/2014 | Fujishiro | B60W 10/20 |
| | | | 701/1 |
| 2014/0278059 A1* | 9/2014 | Gunther | G01C 21/3697 |
| | | | 701/414 |
| 2015/0081201 A1* | 3/2015 | Rubin | G01C 21/26 |
| | | | 701/301 |
| 2015/0232090 A1* | 8/2015 | Jeon | B60W 50/14 |
| | | | 701/1 |
| 2015/0343947 A1* | 12/2015 | Bernico | G08G 1/096741 |
| | | | 340/436 |
| 2015/0353133 A1* | 12/2015 | Mukai | B62D 15/0265 |
| | | | 701/41 |
| 2016/0086285 A1* | 3/2016 | Jordan Peters | G08G 1/096827 |
| | | | 701/484 |
| 2016/0169690 A1* | 6/2016 | Bogovich | G08G 1/096816 |
| | | | 701/423 |
| 2016/0171521 A1* | 6/2016 | Ramirez | G08G 1/096838 |
| | | | 701/409 |
| 2016/0232790 A1* | 8/2016 | Massey | G08G 1/096716 |
| 2016/0335892 A1* | 11/2016 | Okada | G08G 1/164 |
| 2016/0343250 A1* | 11/2016 | Yoshii | G08G 1/017 |
| 2017/0053461 A1* | 2/2017 | Pal | G08G 1/012 |
| 2017/0080927 A1* | 3/2017 | Suzuki | B60R 16/0232 |
| 2017/0110009 A1* | 4/2017 | Knoepfle | G08G 1/052 |
| 2017/0197551 A1* | 7/2017 | Lee | B60W 50/14 |
| 2017/0210323 A1* | 7/2017 | Cordova | G08G 1/0129 |
| 2017/0234689 A1* | 8/2017 | Gibson | G05D 1/0061 |
| | | | 701/25 |
| 2017/0236210 A1* | 8/2017 | Kumar | B60W 50/082 |
| | | | 705/4 |
| 2017/0267244 A1* | 9/2017 | Kim | B60W 10/182 |
| 2017/0269684 A1* | 9/2017 | Murai | G09G 3/004 |
| 2017/0274876 A1* | 9/2017 | Kim | G01S 13/862 |
| 2017/0287332 A1* | 10/2017 | Ranninger Hernandez | |
| | | | B60W 30/09 |
| 2018/0053401 A1* | 2/2018 | Martin | H04M 11/04 |
| 2018/0072313 A1* | 3/2018 | Stenneth | G01S 17/89 |
| 2018/0075309 A1* | 3/2018 | Sathyanarayana | G06V 40/20 |
| 2018/0151074 A1* | 5/2018 | Noto | B60W 30/09 |
| 2018/0165531 A1* | 6/2018 | Sathyanarayana | G07C 5/0866 |
| 2018/0170374 A1* | 6/2018 | Otsuka | B60W 30/0956 |
| 2018/0194364 A1* | 7/2018 | Asakura | B60W 60/0059 |
| 2018/0216952 A1* | 8/2018 | Krumm | G01C 21/3676 |
| 2018/0233048 A1* | 8/2018 | Andersson | B60Q 9/008 |
| 2018/0268695 A1* | 9/2018 | Agnew | B60W 50/14 |
| 2018/0276485 A1* | 9/2018 | Heck | G06N 7/01 |
| 2018/0284785 A1* | 10/2018 | Berntorp | G08G 1/166 |
| 2018/0370528 A1* | 12/2018 | Rittger | G06V 20/588 |
| 2019/0039614 A1* | 2/2019 | Nagata | B60W 10/20 |
| 2019/0061750 A1* | 2/2019 | Tamura | B60W 30/0956 |
| 2019/0111921 A1* | 4/2019 | Hehn | G01C 21/30 |
| 2019/0143968 A1* | 5/2019 | Song | B60W 10/18 |
| 2019/0275939 A1* | 9/2019 | Kim | B60W 30/095 |
| 2019/0276013 A1* | 9/2019 | Kim | G06V 20/588 |
| 2019/0329794 A1* | 10/2019 | Kim | B60W 50/14 |
| 2019/0337533 A1* | 11/2019 | Kume | B60K 35/28 |
| 2019/0375430 A1* | 12/2019 | Emura | G08G 1/16 |
| 2019/0382003 A1* | 12/2019 | Jiang | G08G 1/163 |
| 2020/0023840 A1* | 1/2020 | Taylor | B60W 30/0956 |
| 2020/0051435 A1* | 2/2020 | Hashimoto | G08G 1/166 |
| 2020/0082783 A1* | 3/2020 | Holland | G09G 5/10 |
| 2020/0180611 A1* | 6/2020 | Klingemann | B60W 50/14 |
| 2020/0216063 A1* | 7/2020 | Lim | G08G 1/166 |
| 2020/0361454 A1* | 11/2020 | Takaki | B60W 40/072 |
| 2021/0039639 A1* | 2/2021 | Song | G06V 20/584 |
| 2021/0074160 A1* | 3/2021 | Skipp | G07C 5/02 |
| 2021/0089938 A1 | 3/2021 | Ariannezhad et al. | |
| 2021/0101526 A1* | 4/2021 | Lacher | B60Q 1/547 |
| 2021/0164792 A1* | 6/2021 | Pal | G01C 21/3453 |
| 2021/0188261 A1* | 6/2021 | Song | B60W 40/105 |
| 2021/0192841 A1* | 6/2021 | Hu | G01S 13/867 |
| 2021/0258486 A1* | 8/2021 | Fields | G08G 1/162 |
| 2021/0268998 A1* | 9/2021 | Brickwedde | G08G 1/166 |
| 2021/0300345 A1* | 9/2021 | Sato | G08G 1/096725 |
| 2021/0300354 A1* | 9/2021 | McGill | B60W 30/18154 |
| 2021/0358310 A1* | 11/2021 | Sachs | G08G 5/22 |
| 2022/0017077 A1* | 1/2022 | Seshadri | G01S 13/931 |
| 2022/0017084 A1* | 1/2022 | Hausleitner | B60W 40/09 |
| 2022/0169275 A1* | 6/2022 | Yang | B60W 60/001 |
| 2022/0185270 A1* | 6/2022 | Aoki | B60W 40/114 |

(56) References Cited

U.S. PATENT DOCUMENTS

| | | | |
|---|---|---|---|
| 2022/0194411 A1* | 6/2022 | Lee | B60W 10/18 |
| 2022/0219683 A1* | 7/2022 | Chikamori | B60W 60/0015 |
| 2022/0262236 A1* | 8/2022 | Ueno | G06V 20/20 |
| 2022/0276063 A1* | 9/2022 | Berman | G01C 21/3484 |
| 2022/0281443 A1* | 9/2022 | Sung | B60W 40/08 |
| 2022/0314977 A1* | 10/2022 | Yasui | B60W 10/18 |
| 2022/0332313 A1* | 10/2022 | Abbruzzesi | B60W 50/14 |
| 2023/0005372 A1* | 1/2023 | Lindberg | G01C 21/3461 |
| 2023/0042903 A1* | 2/2023 | Chen | G07C 5/02 |
| 2023/0095384 A1* | 3/2023 | Sharma Banjade | G08G 1/096725 701/301 |
| 2023/0113532 A1* | 4/2023 | Lindberg | G08G 1/0133 701/428 |
| 2023/0150450 A1* | 5/2023 | Wang | B60Q 9/008 701/45 |
| 2023/0166730 A1* | 6/2023 | Izumi | B60W 30/18145 701/301 |
| 2023/0211780 A1* | 7/2023 | Tanaka | B60W 50/0097 340/576 |
| 2023/0219541 A1* | 7/2023 | Yoshizawa | G08G 1/20 701/96 |
| 2023/0303086 A1* | 9/2023 | Ito | B60K 28/02 |
| 2023/0359419 A1* | 11/2023 | Khoo | B60K 35/00 |
| 2023/0415734 A1* | 12/2023 | Zhu | G01S 13/867 |
| 2024/0017737 A1* | 1/2024 | Hadapanah | G08G 1/096775 |
| 2024/0071231 A1* | 2/2024 | Nohara | B60Q 3/217 |
| 2024/0092382 A1* | 3/2024 | Sabatini | B60W 30/0956 |
| 2024/0161623 A1* | 5/2024 | Kawasaki | B60W 30/095 |

FOREIGN PATENT DOCUMENTS

| | | | | |
|---|---|---|---|---|
| CN | 119176143 A | * | 12/2024 | |
| EP | 4113064 A1 | * | 1/2023 | B60W 60/0059 |
| JP | 2023522131 A | * | 5/2023 | |
| JP | 7300700 B2 | * | 6/2023 | |
| KR | 19990050135 A | * | 7/1999 | |

OTHER PUBLICATIONS

"Vehicular Data Space: The Data Point of View;" Rettore et al., IEEE Communications Surveys & Tutorials (vol. 21, Issue: 3, 2019, pp. 2392-2418); Jul. 1, 2019. (Year: 2019).*

"How Effective are Identification Technologies in Autonomous Driving Vehicles?;" Piramuthu et al., 2021 4th International Conference on Advanced Communication Technologies and Networking (CommNet) (2021, pp. 1-10); Dec. 3, 2021. (Year: 2021).*

Ramírez, Andrés Felipe et al., "Spatiotemporal correlation study of traffic accidents with fatalities and injuries in Bogota (Colombia)", Accident Analysis and Prevention, vol. 149, Nov. 6, 2020, 18 pages.

European Search Report mailed Dec. 7, 2021 for European Application No. 21183230.8, 8 pages.

* cited by examiner

ESTIMATION OF ACCIDENT INTENSITY FOR VEHICLES

CROSS-REFERENCE TO RELATED APPLICATIONS

The present application for patent claims priority to European Patent Office Application Ser. No. 21183230.8, entitled "ESTIMATION OF ACCIDENT INTENSITY FOR VEHICLES" filed on Jul. 1, 2021, assigned to the assignee hereof, and expressly incorporated herein by reference.

TECHNICAL FIELD

The present invention relates to estimation of accident intensities for vehicles, and in particular to estimation of accident intensities in a statistical sense (e.g. intensity of a Poisson point process).

BACKGROUND

During these last few years, the development of autonomous vehicles has exploded and many different solutions are being explored. An increasing number of modern vehicles have advanced driver-assistance systems (ADAS) to increase vehicle safety and more generally road safety. ADAS—which for instance may be represented by adaptive cruise control, ACC, collision avoidance system, forward collision warning, etc.—are electronic systems that may aid a vehicle driver while driving. To function as intended, ADAS may rely on inputs from multiple data sources, such as e.g. automotive imaging, LIDAR, radar, image processing, computer vision, and/or in-car networking.

Today, development is ongoing in both ADAS as well as Autonomous Driving (AD), within a number of different technical areas within these fields. ADAS and AD will herein be referred to under the common term Automated Driving System (ADS) corresponding to all of the different levels of automation as for example defined by the SAE J3016 levels (0-5) of driving automation.

Accordingly, in a not too distant future, ADS solutions will to a greater extent find their way into modern vehicles. An ADS may be construed as a complex combination of various components that can be defined as systems where perception, decision making, and operation of the vehicle are performed by electronics and machinery instead of a human driver, and as introduction of automation into road traffic. This includes handling of the vehicle, destination, as well as awareness of surroundings. While the automated system has control over the vehicle, it allows the human operator to leave all responsibilities to the system. An ADS commonly combines a variety of sensors to perceive the vehicle's surroundings, such as e.g. radar, LIDAR, sonar, camera, navigation system e.g. GPS, odometer and/or inertial measurement units (IMUs), upon which advanced control systems may interpret sensory information to identify appropriate navigation paths, as well as obstacles and/or relevant signage.

It is important that an ADS functions with high reliability and integrity to reduce the risk for the vehicle occupant(s) as well as their surrounding environments to an acceptable level. Ensuring that the risk is sufficiently low requires huge amounts of data to evidence the performance of the ADS. A statistical proof that an ADS is capable of responding to all possible or statistically relevant experiences a vehicle could encounter whilst being driven could, in theory, be obtained by testing the vehicle in the field before the vehicle is sold and driven on public roads. In practice, however, capturing such test data to show how an ADS would respond to every conceivable situation a vehicle could experience would take centuries using currently available technologies. Sharing the experiences of a fleet of, for example, a hundred test vehicles, is currently estimated to require around 500 years for sufficient data to be acquired to provide such a statistical proof. As this length of time is not practical, currently ADS features installed before a vehicle is driven on public roads are made as safe as possible, and are supplemented by monitoring the ADS of the vehicle whilst it is being driven on public roads in order to ensure that the ADS is performing to the required safety levels.

To this end, there have been a number of proposals for increasing the general road safety by utilizing databases with historical accident data to notify the vehicle's ADS or the driver of the vehicle of upcoming road portions associated with historical accidents. For example, EP 3 227 148 A2 discloses a solution where gathered accident data is analyzed for the purpose of sending notifications to educate the users and alert them about accident patterns and precautious measures when being in locations associated with historical accidents.

However, such methods have an inherent flaw in that they are essentially based on the presumption that accident events have occurred at specific geographical locations and/or during specific environmental conditions and that, those locations and/or environmental conditions are therefore high risk scenarios. However, such methods cannot be used to infer the actual risk of driving at those specific locations and/or during those specific environmental conditions at other appropriately defined similar locations.

There is accordingly a need for improvements in the art for estimating the risk that a vehicle is about to be exposed to in order to potentially warn the driver of the vehicle or the ADS of the vehicle, and thereby improve the overall road safety.

SUMMARY

It is therefore an object of the present invention to provide a method for alerting drivers and/or autonomous vehicles of high risk scenarios, a computer-readable storage medium, an apparatus, and a vehicle comprising such an apparatus that alleviate all or at least some of the above-discussed drawbacks of presently known systems and methods.

This object is achieved by means of a method for alerting drivers and/or autonomous vehicles of high risk scenarios, a computer-readable storage medium, an apparatus, and a vehicle comprising such an apparatus as defined in the appended independent claims. The term exemplary is in the present context to be understood as serving as an instance, example or illustration.

According to a first aspect of the present invention, there is provided a method for alerting drivers and/or autonomous vehicles of high risk scenarios. The method comprises obtaining positional data of a vehicle, where the positional data is indicative of a geographical position and a heading of the vehicle. The method further comprises obtaining environmental data of the vehicle, where the environmental data is indicative of a state of the surrounding environment of the vehicle. Furthermore, the method comprises determining, by means of a trained model, an accident intensity for an upcoming road portion for the vehicle, the trained model being configured to determine an accident intensity associated with the upcoming road portion based on the obtained environmental data and the obtained positional data. Then, if the determined accident intensity exceeds a threshold, the method comprises transmitting a signal indicating an approaching high risk scenario to a Human-Machine-Interface, HMI, of the vehicle and/or to a control system of the vehicle.

According to a second aspect of the present invention, there is provided computer-readable storage medium storing one or more programs configured to be executed by one or more processors of a processing system, the one or more programs comprising instructions for performing the method according to any one of the embodiments disclosed herein. With this aspect of the invention, similar advantages and preferred features are present as in the previously discussed first aspect of the invention.

The term "non-transitory," as used herein, is intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link. Thus, the term "non-transitory", as used herein, is a limitation of the medium itself (i.e., tangible, not a signal) as opposed to a limitation on data storage persistency (e.g., RAM vs. ROM).

According to a second aspect of the present invention, there is provided an apparatus for alerting drivers and/or autonomous vehicles of high risk scenarios. The apparatus comprises control circuitry configured to obtain positional data of a vehicle, where the positional data indicates a geographical position and a heading of the vehicle. The control circuitry is further configured to obtain environmental data of the vehicle, where the environmental data indicates a state of the surrounding environment of the vehicle. Furthermore, the control circuitry is configured to determine, by means of a trained model, an accident intensity for an upcoming road portion for the vehicle, the trained model being configured to determine an accident intensity associated with the upcoming road portion based on the obtained environmental data and the obtained positional data. Moreover, if the determined accident intensity exceeds a threshold, the control circuitry is configured to transmit a signal indicating an approaching high risk scenario to a Human-Machine-Interface, HMI, of the vehicle and/or to a control system of the vehicle. With this aspect of the invention, similar advantages and preferred features are present as in the previously discussed first aspect of the invention.

According to a fourth aspect of the present invention, there is provided a vehicle comprising a localization system for generating positional data indicating a geographical location and a heading of the vehicle, and an apparatus according to any one of the embodiments disclosed herein. With this aspect of the invention, similar advantages and preferred features are present as in the previously discussed first aspect of the invention.

An advantage of some embodiments is that a driver of a vehicle or an ADS of a vehicle can be warned in due time before entering a potential high-risk region. Thereby general road safety may be improved.

An advantage of some embodiments is that the determined accident intensity may be taken into account in a path planning or routing solution so that potential high-risk regions can be avoided already in the planning stage. Thereby general road safety and passenger comfort may be improved.

Further embodiments of the invention are defined in the dependent claims. It should be emphasized that the term "comprises/comprising" when used in this specification is taken to specify the presence of stated features, integers, steps, or components. It does not preclude the presence or addition of one or more other features, integers, steps, components, or groups thereof.

These and other features and advantages of the present invention will in the following be further clarified with reference to the embodiments described hereinafter.

BRIEF DESCRIPTION OF THE DRAWINGS

Further objects, features and advantages of embodiments of the invention will appear from the following detailed description, reference being made to the accompanying drawings, in which.

DETAILED DESCRIPTION

Those skilled in the art will appreciate that the steps, services and functions explained herein may be implemented using individual hardware circuitry, using software functioning in conjunction with a programmed microprocessor or general purpose computer, using one or more Application Specific Integrated Circuits (ASICs) and/or using one or more Digital Signal Processors (DSPs). It will also be appreciated that when the present invention is described in terms of a method, it may also be embodied in one or more processors and one or more memories coupled to the one or more processors, wherein the one or more memories store one or more programs that perform the steps, services and functions disclosed herein when executed by the one or more processors.

In the following description of exemplary embodiments, the same reference numerals denote the same or similar components. A vehicle is in the present context to be understood as a road vehicle such as e.g. a car, a bus, a truck, or the like. The vehicle may be equipped with an Automated Driving System (ADS) and may therefore be capable of autonomous or semi-autonomous operation.

As mentioned in the foregoing there is a plethora of suggested approaches for identifying approaching high-risk scenarios. However, the present inventor realized that by forming a measure of accident intensities associated with the scenarios that a vehicle may be exposed to, a new and improved solution may be realized for warning a driver or an automated driving system about approaching high-risk scenarios. Further, it was realized that merely relying on data from an "accident database" and comparing the reported geographical position at the time of the accident (critical scenario) with a current position and heading of a vehicle may give a blunt estimate of the "risk" that the vehicle is or will be exposed to. In more detail, given accident data, together with related data such as traffic flow at site and time of accident, speed limit at site of accident, etc., one is only able to answer questions such as—"How many accidents happen while driving 70 km/h on a specific stretch of road during rain at night?"—Such questions, while interesting in their own right, say nothing about the actual risk the individual driver faces while driving 70 km/h in rain at night on the specific stretch of road.

In other words, the present inventor realized that one may utilize an "accident intensity" (in a Poisson sense), to obtain a better estimate the risk exposure of the vehicle for upcoming scenarios. However, to be able to obtained such estimates, one needs to estimate a "number of attempts", i.e. how large proportion of all time and/or mileage spent on roads occur with specific environmental conditions that correspond to the environmental conditions of each accident and/or critical scenario (e.g. near-accident scenario).

Therefore, it is herein suggested that one trains a model based on accident data from an accident database comprising information about a plurality of critical scenarios at a time of each critical scenario (e.g. weather conditions during the critical scenario, time of day at the critical scenario, type of critical scenario, road type at the critical scenario, road conditions at the critical scenario, etc.) and data indicative of frequencies of similar situations as the critical scenarios. The term "road type" as used herein may be understood a characterization of the road such as e.g. national highway, controlled-access highway, state highway, district road, country road, highroad, rural road and so forth.

The data indicative of frequencies of similar situations (i.e. "number of attempts") may for example be derived from a "proxy" such as e.g. traffic flow monitoring solutions (tracking actual traffic flow or reported mobile devices) or reported directly from a fleet of connected vehicles. In the latter case, and in accordance with some embodiments, the data indicative of frequencies of similar situations is in the form of environmental data (e.g. time of day, weather conditions, road surface conditions, speed limits, type of road, etc.) obtained over time from a plurality of vehicles in a fleet of vehicles. In more detail, a fleet management system may for example request "status reports" from all or a subset of vehicles in a fleet of "connected" vehicles, and over time build the above-mentioned model—"Accident intensity model"—capable of estimating accident intensities for a multitude of scenarios. An advantage of utilizing a fleet of vehicles is that more nuanced data may be available (due to the sensory capabilities of modern vehicles, and in particular ADS-equipped vehicles), which consequently provides a better estimate of the "number of attempts" and thereby a better estimate of the accident intensity for a given scenario, and in extension a better risk assessment for the scenario.

Figure 1:
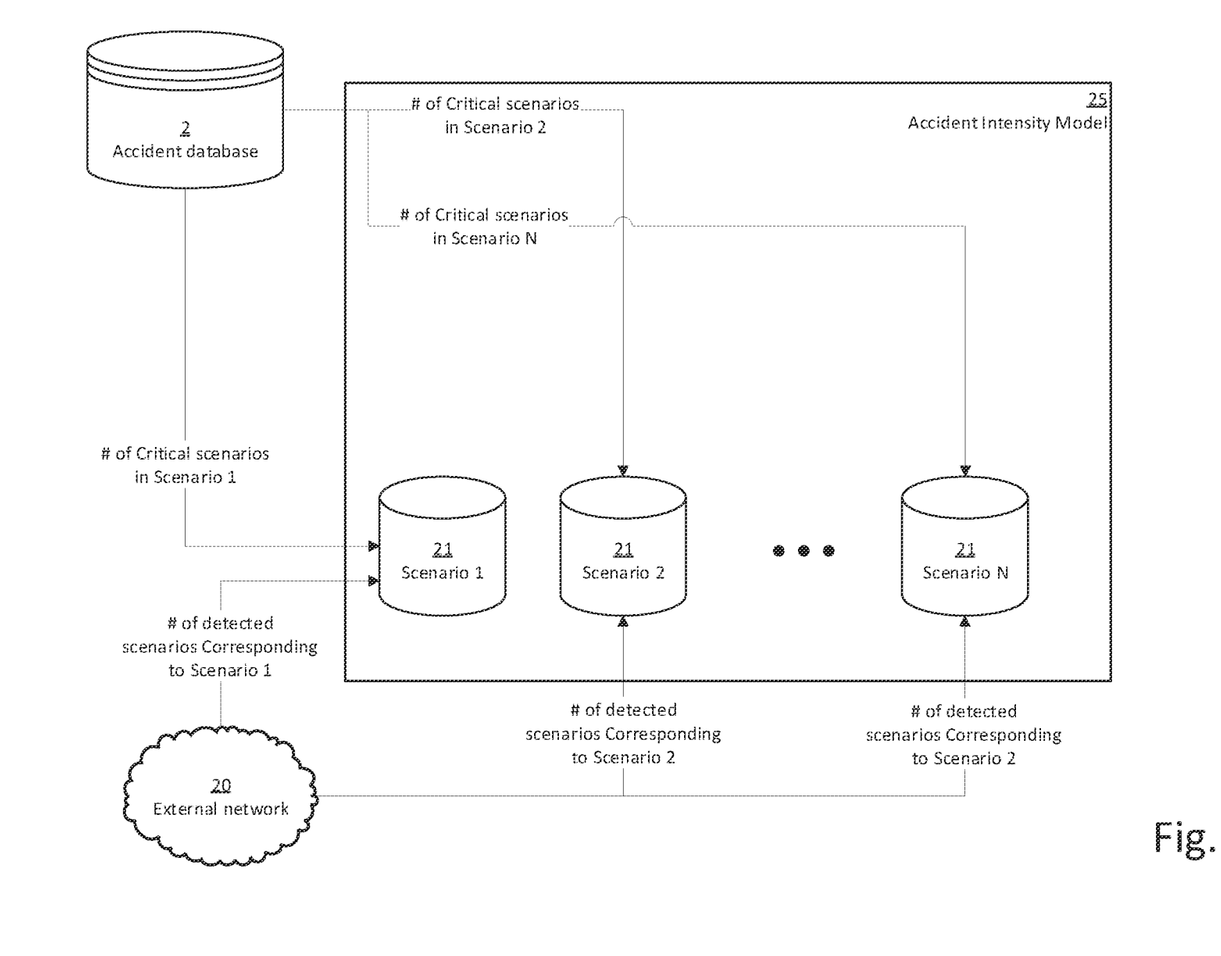
FIG. 1 is a schematic block diagram representation of an accident intensity model in accordance with some embodiments.

Turning to FIG. 1, a schematic block diagram illustration of an accident intensity model 25 is provided. In more detail, FIG. 1 depicts an example embodiment of how the accident intensity model 25 may be formed and trained/updated over time. Here, each scenario 21 is depicted as a "container" that is formed based on the information associated with each critical scenario that is obtained from an accident database 2. For example, a first scenario 21 ("Scenario 1") may be "driving/traveling at 100 km/h in rain at night on a controlled-access highway", while a second scenario 21 ("Scenario 2") may be "driving/traveling at 60 km/h with icy road conditions, during the day, on a multi-lane road in a densely populated area", and so forth. It should be noted that the type and number of parameters comprised in each scenario may be set independently and have more parameters than the examples provided above. For example, the scenario may further include a time of day, day of week, outside temperature, geographical area/position, speed limit of the associated road portion, presence of barriers, and so forth. In other words, the accident data, that is obtained from the accident database, is at least indicative of a time and location of each critical scenario (e.g. each accident or "near-accident"). However, the accident data may further be indicative of a road surface condition, a weather condition, presence of road barriers, presence of wildlife fence barriers, number of involved vehicles in the critical scenario, severity of the critical scenario, and so forth.

Moving on, over time, the accident intensity model 25 is further provided with an input in the form of data indicative of frequencies of similar situations as the critical scenarios. This data may for example be retrieved via an external network 20. In more detail, this data may be obtained via a suitable "proxy" output as exemplified above (i.e. indirectly) or directly via "fleet data" (i.e. environmental data retrieved/received from a fleet of vehicles). The latter case may also be construed as a "proxy" of the actual "number of attempts" as one can further apply some statistical modelling on the "fleet data" to obtain an estimate of the "number of attempts" on a bigger scale (e.g. for a whole country). For example, if one knows how many vehicles are in the fleet, the rate of exposure of a given scenario in the fleet, and the percentage of the total population (e.g. of a country) that this fleet represents, one can derive an estimate of the "number of attempts" on a larger scale.

The term "proxy" is in the present context be interpreted broadly and can be understood as any measure indicative of similar situations as the critical scenarios. In other words, the proxy provides data, from which, a number of similar situations as the critical scenarios is derivable.

Further, any time data is retrieved or received via the external network 20, it is "stored" in an appropriate container 21 corresponding to the critical scenario. Then, as the containers 21 are populated, the accident intensity model 25 is capable of providing an output indicative of an accident intensity for each scenario. As the skilled reader readily understands, over time, the accident intensity model 25 will be capable of providing more reliable indications of the accident intensity for a multitude of scenarios that a vehicle may be exposed to.

Figure 2:
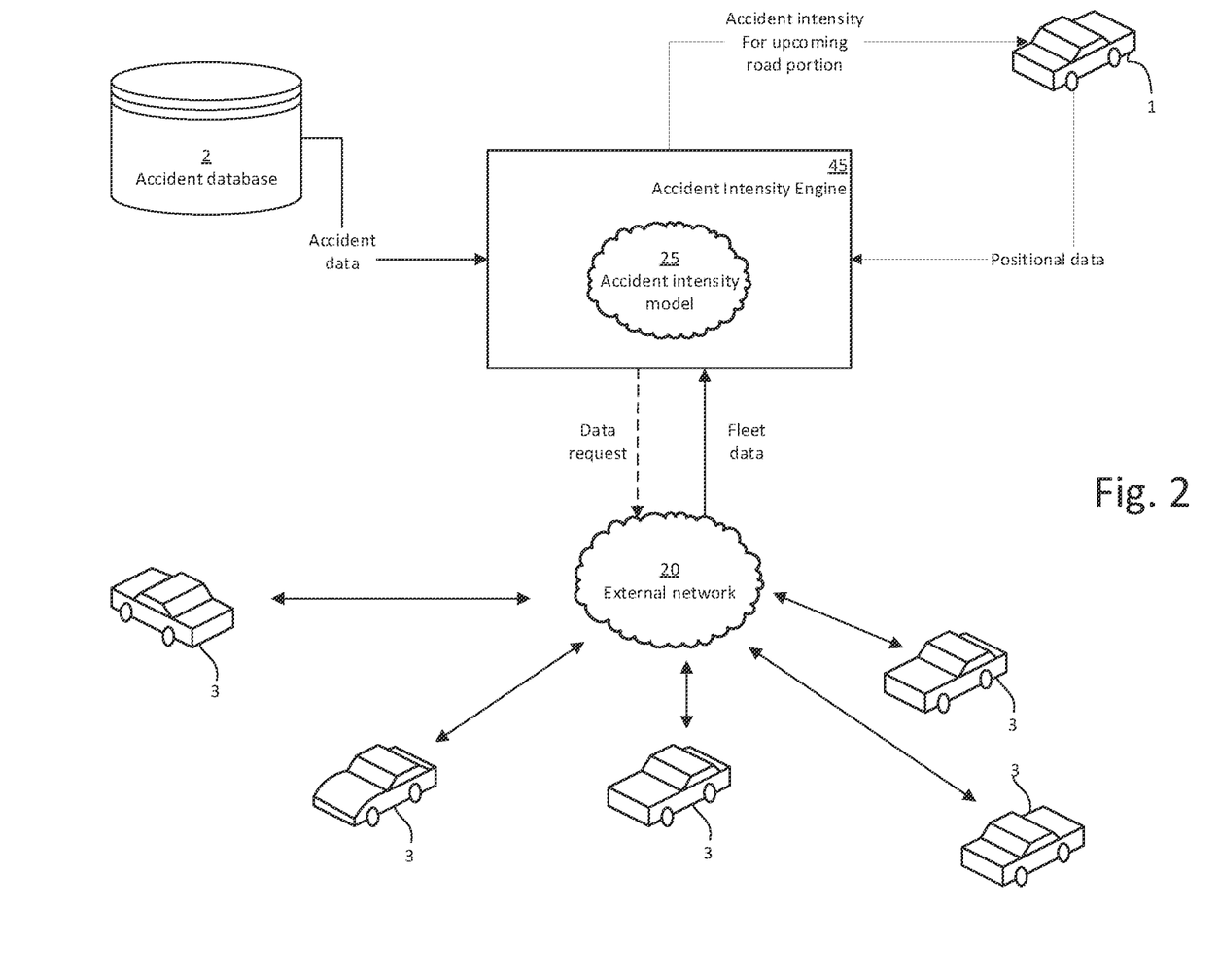
FIG. 2 is a schematic block diagram representation of an accident intensity engine in accordance with some embodiments.

Further, FIG. 2 illustrates a schematic block diagram representation of an accident intensity engine 45 comprising an accident intensity model 25 as described above. The accident intensity model 25 (i.e. trained model) receives historical accident data from a suitable accident database 2 and data indicative of frequencies of similar situations as the critical scenarios (here in the form of "fleet data"). The fleet data is obtained from a plurality of vehicles 3, each being part of a fleet of connected vehicles, via an external network 20. The accident intensity engine 45 may be configured to (periodically) transmit a data request to one or more (randomly selected) vehicles 3 of the fleet via the external network 20. The data request may for example be sent (periodically) to a random subset of vehicles 3 of the fleet. Upon receiving the request, the one or more vehicles 3 are configured to transmit environmental data to the accident intensity engine 45 via the external network. The transmitted environmental data may for example be a geographical position (e.g. GNSS coordinates), heading, time, temperature, and current speed/velocity of the vehicle). Thus, the environmental data may be indicative of a state of the surrounding environment and furthermore indicative of a state of the (reporting) vehicle 3. In some embodiments, the environmental data further comprises map data (e.g. type of road, presence of barriers, presence of wildlife barrier fences, etc.), number of external vehicles in the surrounding environment, road surface conditions, and weather conditions.

Once the accident intensity model 25 is trained, a vehicle 1 may use the accident intensity engine to obtain a risk estimate for an upcoming road portion (e.g. as part of an automated procedure as the vehicle is autonomously or semi-autonomously operated). In more detail, the vehicle 1 is configured to transmit (time-stamped) positional data indicating a geographical position and a heading (i.e. to transmit a pose) and optionally environmental data indicating a state of the surrounding environment (e.g. road type, weather conditions, and/or road surface conditions). The environmental data may further indicate a state of the vehicle 1 (e.g. speed of the vehicle, windshield wiper status, etc.).

In some embodiments, the weather and road conditions are not directly indicated in the environmental data, but instead derived (by the accident intensity engine 45 or locally in the vehicle 1) from the output of vehicle-mounted sensors. For example, a status of the vehicle's windshield wipers (engaged/disengaged) may be used to derive a weather condition (e.g. rain, snow, etc.), alternatively the output from a vehicle-mounted camera may be used to derive the current weather conditions and road conditions by means of a suitable image-processing algorithm as conventionally known. Moreover, in accordance with a further example, road conditions may be determined by estimating the difference in the speeds of the drive shaft and freely rotating axles in various driving situations and from that difference a level of friction may be derived in order to e.g. determine a presence of ice on the road. However, in some embodiments, weather conditions and/or road conditions may be indirectly obtained by comparing the vehicle's 1 reported position with a weather forecast for that geographical region.

Once the positional data and the environmental data is received by the accident intensity engine 45, the accident intensity engine 45 is configured to determine, by means of the trained accident intensity model 25, an accident intensity for an upcoming road portion for the vehicle 1. As discussed in the foregoing, the accident intensity model is configured to use the reported pose of the vehicle and the associated environmental data to find a corresponding/matching scenario (see ref. 21 in FIG. 1) for the upcoming road portion and to output the accident intensity for that scenario and thereby the accident intensity for the upcoming road portion.

As mentioned, the accident intensity engine may, in accordance with some embodiments, be provided on a server or a plurality of servers e.g. as a so-called cloud solution. However, in some embodiments, the accident intensity engine 45 together with the accident intensity model 25 is provided locally in each vehicle. In the local setup, the accident intensity model 25 may be subdued to periodical updates from a central managing entity.

Figure 3:
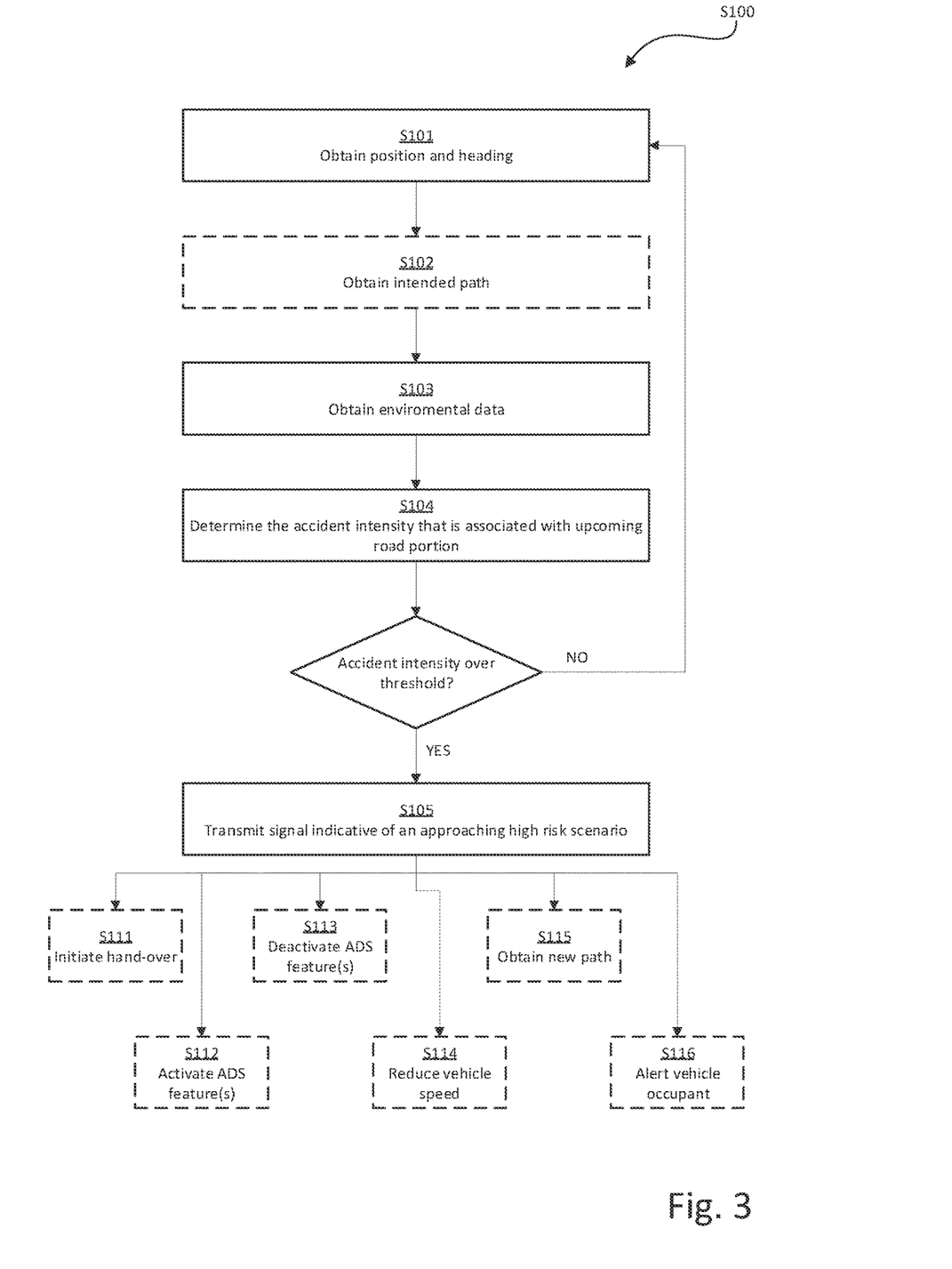
FIG. 3 is a schematic flow diagram representation of a method for alerting drivers and/or autonomous vehicles of high risk scenarios in accordance with some embodiments.

Further, FIG. 3 is a schematic flow chart representation of a method S100 for alerting drivers and/or autonomous vehicles of high risk scenarios in accordance with some embodiments. The method S100 comprises obtaining S101 positional data of a vehicle, where the positional data is at least indicative of a geographical position (e.g. GPS position) and a heading of the vehicle. In other words, the method S100 comprises obtaining S101 of a vehicle.

In some embodiments, the method S100 further comprises obtaining S102 an intended path of the vehicle. The intended path may for example be a set route in the vehicle's navigation system or generated by an autonomous path planning system.

Further, the method S100 comprises obtaining S103 environmental data of the vehicle, where the environmental data is indicative of a state of the surrounding environment of the vehicle. The environmental data may be indicative of weather conditions (e.g. rain, snow, fog, etc.) and/or road conditions (e.g. dry, icy, snow covered, etc.). The environmental data may be derived from the positional data by comparing the obtained positional data with a weather forecast for that geographical region. However, in some embodiments, the environmental data is either directly or indirectly reported by the vehicle as described in the foregoing. Moreover, in accordance with some embodiments, the environmental data is further indicative of a state of the vehicle, such as e.g., a current speed of the vehicle.

Still further, the method S100 comprises determining S104, by means of a trained model, an accident intensity for an upcoming road portion for the vehicle. Here, the trained model (e.g. accident intensity model as described in the foregoing) is configured to determine an accident intensity associated with the upcoming road portion based on the obtained environmental data and the obtained positional data. The accident intensity may be construed as an intensity in a Poisson sense. In other words, "intensity" as used herein may be understood as the intensity of a nonhomogeneous Poisson point process, where the intensity function depends on e.g., temperature, traffic flow, etc., as discussed above. Expected values, or similar concepts of interest, can then be calculated given this model.

Then, if the determined S104 accident intensity exceeds a threshold, the method S100 comprises transmitting S105 a signal indicating an approaching high risk scenario to a Human-Machine-Interface, HMI, of the vehicle and/or to a control system of the vehicle. "High risk" is herein to be understood as a risk above the threshold as indicated by the determined S104 accident intensity.

Accordingly, in some embodiments, the signal indicating the approaching high risk scenario is transmitted S105 to the control system of the vehicle (e.g. to an ADS of the vehicle) in order to generate S111 a hand-over request or initiate a hand-over procedure. The hand-over may either be from autonomous control to manual control (i.e. from the ADS to the driver) or vice versa, depending on the situation. Moreover, in some embodiments, the signal indicating the approaching high risk scenario is transmitted S105 to the control system of the vehicle in order to activate S112 one or more ADS features. In more detail, if it is concluded that the vehicle is approaching a high risk scenario, one may activate one or more suitable security measures (e.g. Emergency Brake Assist, Lane Keeping Assist, etc.).

Further, in some embodiments, the signal indicating the approaching high risk scenario is transmitted S105 to the control system of the vehicle in order to deactivate S113 one or more ADS features. This may for example be done in connection with the completion of the hand-over procedure.

In some embodiments, the signal indicating the approaching high risk scenario is transmitted S105 to the control system of the vehicle in order to reduce S114 a speed of the vehicle. Moreover, in some embodiments, the signal indicating the approaching high risk scenario is transmitted S105 to the control system of the vehicle in order to obtain S115 a new candidate path for execution by an Automated Driving System, ADS, of the vehicle, wherein the new candidate path is configured to avoid the upcoming road portion. Thereby, the vehicle may suggest a different route to the driver or to the ADS, given that the different route has the same goal position, as the previously intended route.

Accordingly, by utilizing a trained model 25 to determine the accident intensity—where the trained model is configured to determine an accident intensity associated with the upcoming road portion based on environmental data (e.g. time of day, weather conditions, states of surrounding vehicles, road conditions, current speed of ego-vehicle, etc.) and the vehicle's positional data—the overall road safety and user-experience of a vehicle occupant can be improved.

Executable instructions for performing these functions are, optionally, included in a non-transitory computer-readable storage medium or other computer program product configured for execution by one or more processors.

Figure 4:
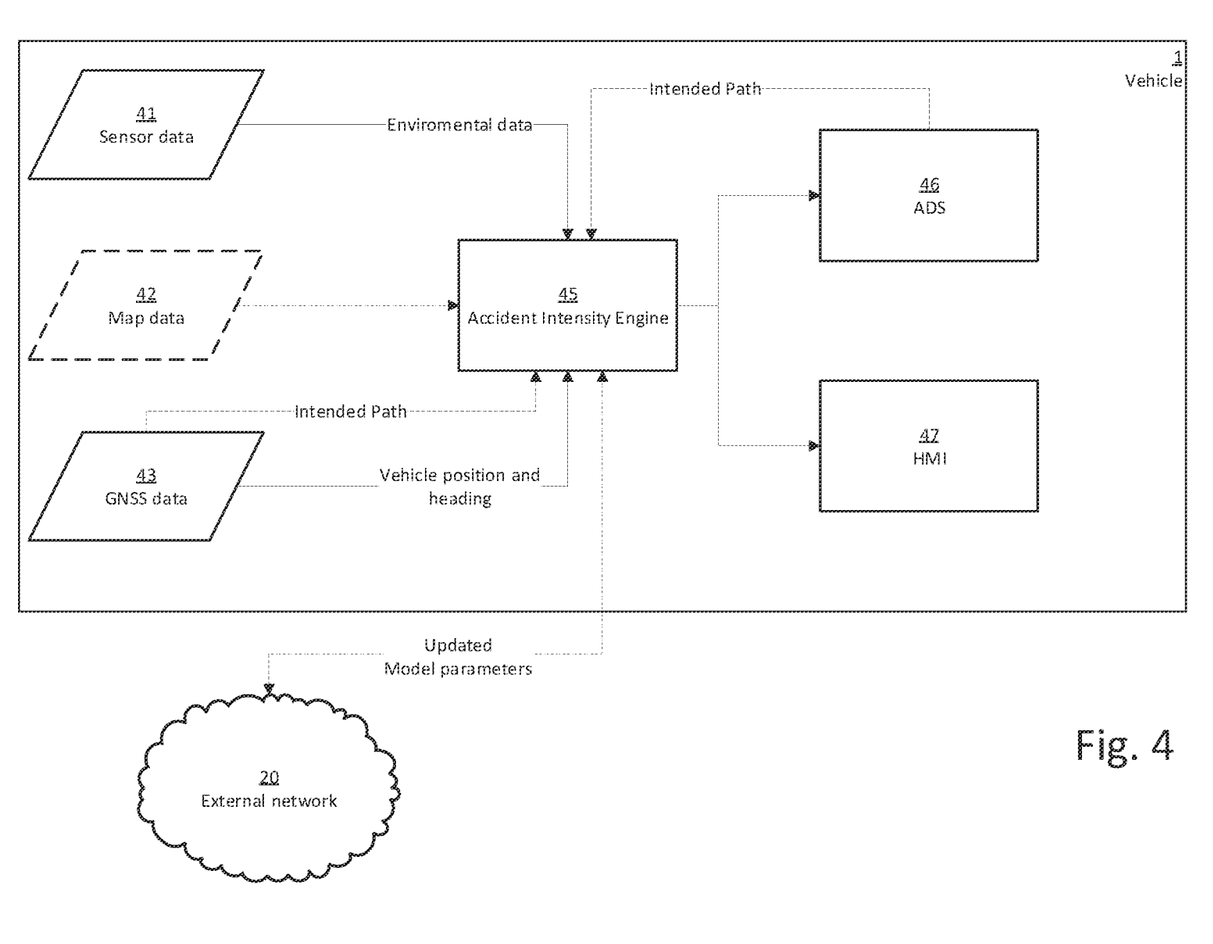
FIG. 4 is a schematic block diagram representation of an apparatus for alerting drivers and/or autonomous vehicles of high risk scenarios.

FIG. 4 is a schematic block diagram representation of an apparatus, here represented by the accident intensity engine 45, for alerting drivers and/or autonomous vehicles of high risk scenarios in accordance with an embodiment of the present invention. In general, FIG. 4 depicts the flow of information from the reporting of the position and heading and of the environmental data, to the accident intensity determination, and further to the potential high risk scenario notification that is transmitted to the ADS 46 or in-vehicle HMI 47. It should be noted that even though the accident intensity engine 45 is exemplified as being comprised by the vehicle 1, it should not be construed as limiting to the present invention. As mentioned in the foregoing, the accident intensity engine 45 may be arranged on one or more servers configured to transmit and receive data to/from the vehicle 1.

Moving on, the vehicle 1 has a localization system, such as e.g., a Global Navigation Satellite System (GNSS) configured to monitor a geographical position and heading/orientation of the vehicle 1. In other words, the localization system is configured to monitor a pose of the vehicle. This positional data is sent to the accident intensity engine 45 together with environmental data indicating a state of the surrounding environment of the vehicle. The environmental data may for example be derived from sensor data 41 generated by suitable vehicle-mounted sensors or from an external source (e.g. a conventional weather forecast service). The sensor data 71 may for example output from one or more of a RADAR device, a LIDAR device, a camera, and ultrasonic sensor, and so forth. The sensor data may provided directly from the vehicle-mounted sensors or indirectly by a perception system of the vehicle. A "perception system" is in the present context to be understood as a system responsible for acquiring raw sensor data from on-board sensors such as cameras, LIDARs and RADARs, ultrasonic sensors, and converting this raw data into scene understanding including state estimates and predictions thereof.

Furthermore in some embodiments, the vehicle 1 has access to map data (e.g. from a local data storage device) such as e.g., HD-map data. The map data may for example be indicative of a road geometry in the surrounding environment of the vehicle, and may be provided as an input to the accident intensity engine. Furthermore, in some embodiments, the accident intensity engine 45 is further configured to receive an intended path of the vehicle. The intended path may for example be provided by a path-planning module of an ADS or by the GNSS.

The accident intensity engine 45 is further configured to determine, by means of a trained model, an accident intensity for an upcoming road portion for the vehicle 1. The trained model is configured to determine an accident intensity associated with the upcoming road portion based on the obtained environmental data and the obtained positional data (and optionally further based on map data 42 and the intended path). Accordingly, if the determined accident intensity exceeds a threshold. Then, the accident intensity engine 45 is configured to transmit a signal indicating an approaching high risk scenario to a Human-Machine-Interface (HMI) 47 of the vehicle 1 and/or to a control system 46 of the vehicle 1.

Figure 5:
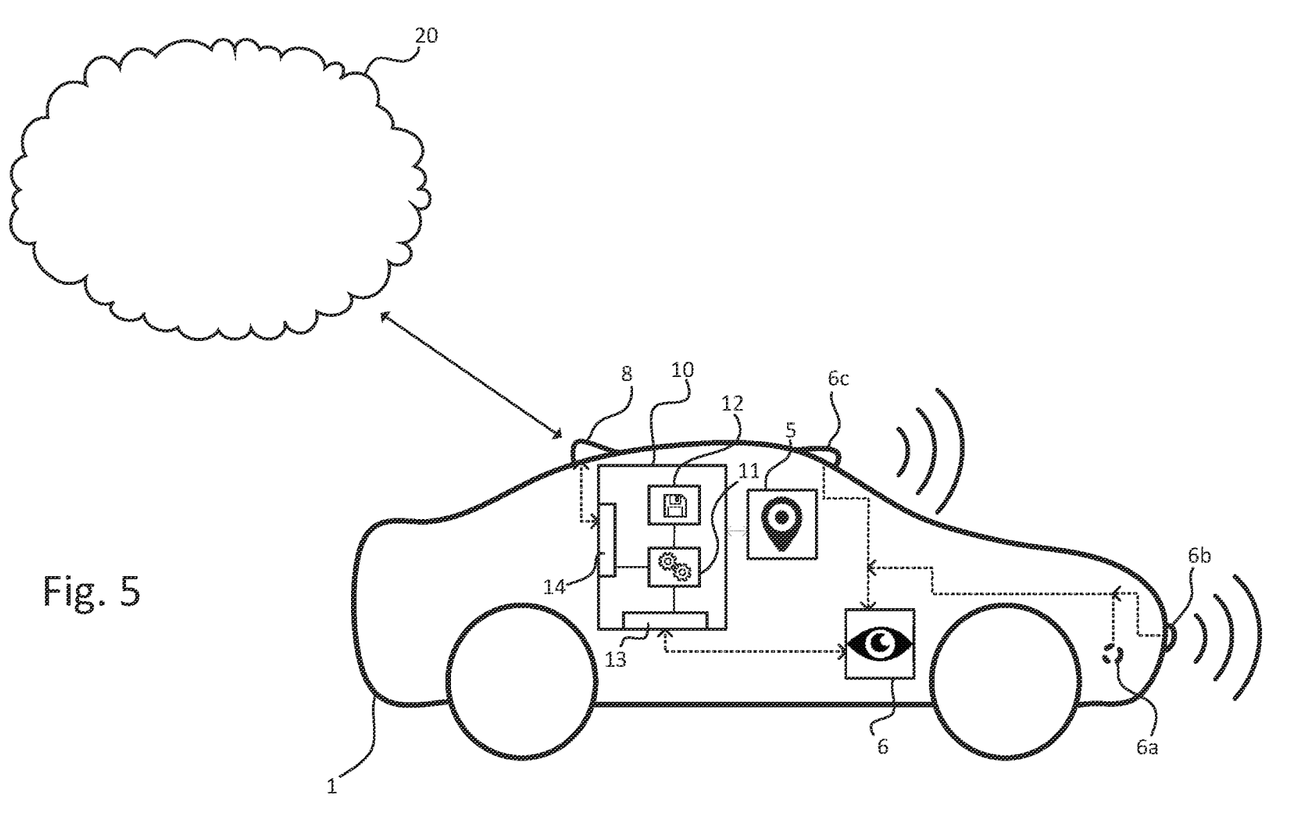
FIG. 5 is a schematic side-view of a vehicle comprising an apparatus for alerting drivers and/or autonomous vehicles of high risk scenarios in accordance with some embodiments.

FIG. 5 depicts a schematic side view of a vehicle 1 comprising an apparatus 10 for alerting drivers and/or autonomous vehicles of high risk scenarios. The vehicle 1 further comprises a perception system 6 and a localization system 5. A perception system 6 is in the present context to be understood as a system responsible for acquiring raw sensor data from on-board sensors 6a, 6b, 6c such as cameras, LIDARs and RADARs, ultrasonic sensors, and converting this raw data into scene understanding. The localization system 5 is configured to monitor a geographical position and heading of the vehicle, and may in the form of a Global Navigation Satellite System (GNSS), such as a GPS. However, the localization system may alternatively be realized as a Real Time Kinematics (RTK) GPS in order to improve accuracy.

In more detail, the perception system 6 may refer to any commonly known system and/or functionality, e.g. comprised in one or more electronic control modules and/or nodes of the vehicle 1, adapted and/or configured to interpret sensory information—relevant for driving of the vehicle 1—to identify e.g. obstacles, vehicle lanes, relevant signage, appropriate navigation paths etc. The exemplified perception system 6 may thus be adapted to rely on and obtain inputs from multiple data sources, such as automotive imaging, image processing, computer vision, and/or in-car networking, etc., in combination with sensory information. Such exemplifying sensory information may for instance be derived from one or more optional surrounding detecting sensors 6a-c comprised in and/or provided on-board the vehicle 1. The surrounding detecting sensors 6a-c may be represented by any arbitrary sensors adapted to sense and/or perceive the vehicle's 1 surroundings and/or whereabouts, and may e.g. refer to one or a combination of one or more of radar, LIDAR, sonar, camera, navigation system e.g. GPS, odometer and/or inertial measurement units.

The apparatus 10 comprises one or more processors 11, a memory 12, a sensor interface 13 and a communication interface 14. The processor(s) 11 may also be referred to as a control circuit 11 or control circuitry 11. The control circuitry 11 is configured to execute instructions stored in the memory 12 to perform a method for estimating a risk exposure of an ADS of the vehicle 1 according to any one of the embodiments disclosed herein. Stated differently, the memory 12 of the apparatus 10 can include one or more (non-transitory) computer-readable storage mediums, for storing computer-executable instructions, which, when executed by one or more computer processors 11, for example, can cause the computer processors 11 to perform the techniques described herein. The memory 12 optionally includes high-speed random access memory, such as DRAM, SRAM, DDR RAM, or other random access solid-state memory devices; and optionally includes non-volatile memory, such as one or more magnetic disk storage devices, optical disk storage devices, flash memory devices, or other non-volatile solid-state storage devices. The apparatus 10 is further provided with a communication interface 14 and a sensor interface 13.

The control circuitry 11 is configured to obtain positional data of a vehicle, where the positional data indicates a geographical position and a heading of the vehicle. The control circuitry 11 is further configured to obtain environmental data of the vehicle, where the environmental data indicates a state of the surrounding environment of the vehicle. Moreover, the control circuitry 11 is configured to determine, by means of a trained model (such as e.g. the accident intensity model 25 illustrated in FIGS. 1 and 2), an accident intensity for an upcoming road portion for the vehicle. The trained model is accordingly configured to determine an accident intensity associated with the upcoming road portion based on the obtained environmental data and the obtained positional data. Then, if the determined accident intensity exceeds a threshold, the control circuitry 11 is configured to transmit a signal indicating an approaching high risk scenario to a Human-Machine-Interface (HMI) of the vehicle 1 and/or to a control system of the vehicle 1.

Furthermore, in some embodiments, the control circuitry 11 is configured to transmit the signal indicating an approaching high risk scenario to an HMI of the vehicle 1, where the HMI is configured to at an electronic device with a display, displaying on the display a user interface comprising a graphical representation indicative of the exceeded threshold. This may for example be used to alert a driver of the vehicle of the upcoming high risk scenario and thereby provide the driver with the possibility to take the appropriate actions (e.g. slow down or take another route).

Moreover, in some embodiments, the control circuitry is configured to transmit the signal indicating an approaching high risk scenario to a control system (e.g. an ADS) of the vehicle 1. In more detail, the control circuitry 11 may thereby cause the ADS to generate a hand-over request, activate one or more ADS features, deactivate one or more ADS features, reduce a speed of the vehicle, and/or obtain a new candidate path for execution by the ADS. An "ADS feature" (also referred to as an ADS function) may for example be an "auto pilot function" or any other partly or fully automated feature for manoeuvring the vehicle 1 or supporting a driver of the vehicle 1.

Further, the vehicle 1 may be connected to external network(s) 20 via for instance a wireless link (e.g. for retrieving map data). The same or some other wireless link may be used to communicate with other vehicles 2 in the vicinity of the vehicle or with local infrastructure elements. Cellular communication technologies may be used for long range communication such as to external networks and if the cellular communication technology used have low latency it may also be used for communication between vehicles, vehicle to vehicle (V2V), and/or vehicle to infrastructure, V2X. Examples of cellular radio technologies are GSM, GPRS, EDGE, LTE, 5G, 5G NR, and so on, also including future cellular solutions. However, in some solutions mid to short range communication technologies are used such as Wireless Local Area (LAN), e.g. IEEE 802.11 based solutions. ETSI is working on cellular standards for vehicle communication and for instance 5G is considered as a suitable solution due to the low latency and efficient handling of high bandwidths and communication channels.

The present invention has been presented above with reference to specific embodiments. However, other embodiments than the above described are possible and within the scope of the invention. Different method steps than those described above, performing the method by hardware or software, may be provided within the scope of the invention. Thus, according to an exemplary embodiment, there is provided a non-transitory computer-readable storage medium storing one or more programs configured to be executed by one or more processors of a vehicle control system, the one or more programs comprising instructions for performing the method according to any one of the above-discussed embodiments. Alternatively, according to another exemplary embodiment a cloud computing system can be configured to perform any of the methods presented herein. The cloud computing system may comprise distributed cloud computing resources that jointly perform the methods presented herein under control of one or more computer program products.

Generally speaking, a computer-accessible medium may include any tangible or non-transitory storage media or memory media such as electronic, magnetic, or optical media—e.g., disk or CD/DVD-ROM coupled to computer system via bus. The terms "tangible" and "non-transitory," as used herein, are intended to describe a computer-readable storage medium (or "memory") excluding propagating electromagnetic signals, but are not intended to otherwise limit the type of physical computer-readable storage device that is encompassed by the phrase computer-readable medium or memory. For instance, the terms "non-transitory computer-readable medium" or "tangible memory" are intended to encompass types of storage devices that do not necessarily store information permanently, including for example, random access memory (RAM). Program instructions and data stored on a tangible computer-accessible storage medium in non-transitory form may further be transmitted by transmission media or signals such as electrical, electromagnetic, or digital signals, which may be conveyed via a communication medium such as a network and/or a wireless link.

The processor(s) 11 (associated with the apparatus 10) may be or include any number of hardware components for conducting data or signal processing or for executing computer code stored in memory 12. The apparatus 10 has an associated memory 12, and the memory 12 may be one or more devices for storing data and/or computer code for completing or facilitating the various methods described in the present description. The memory may include volatile memory or non-volatile memory. The memory 12 may include database components, object code components, script components, or any other type of information structure for supporting the various activities of the present description. According to an exemplary embodiment, any distributed or local memory device may be utilized with the systems and methods of this description. According to an exemplary embodiment the memory 12 is communicably connected to the processor 11 (e.g., via a circuit or any other wired, wireless, or network connection) and includes computer code for executing one or more processes described herein.

It should be appreciated that the sensor interface 14 may also provide the possibility to acquire sensor data directly or via dedicated sensor control circuitry 6 in the vehicle. The communication/antenna interface 14 may further provide the possibility to send output to a remote location (e.g. remote operator or control centre) by means of the antenna 8. Moreover, some sensors in the vehicle may communicate with the apparatus 10 using a local network setup, such as CAN bus, I2C, Ethernet, optical fibres, and so on. The communication interface 14 may be arranged to communicate with other control functions of the vehicle and may thus be seen as control interface also; however, a separate control interface (not shown) may be provided. Local communication within the vehicle may also be of a wireless type with protocols such as WiFi, LoRa, Zigbee, Bluetooth, or similar mid/short range technologies.

Accordingly, it should be understood that parts of the described solution may be implemented either in the vehicle, in a system located external the vehicle, or in a combination of internal and external the vehicle; for instance in a server in communication with the vehicle, a so called cloud solution. For instance, positional data may be sent to an external system and that system performs the steps to determine the accident intensity for an upcoming road portion of the vehicle 1. The different features and steps of the embodiments may be combined in other combinations than those described.

It should be noted that the word "comprising" does not exclude the presence of other elements or steps than those listed and the words "a" or "an" preceding an element do not exclude the presence of a plurality of such elements. It should further be noted that any reference signs do not limit the scope of the claims, that the invention may be at least in part implemented by means of both hardware and software, and that several "means" or "units" may be represented by the same item of hardware.

Although the figures may show a specific order of method steps, the order of the steps may differ from what is depicted. In addition, two or more steps may be performed concurrently or with partial concurrence. For example, the steps of obtaining positional data and obtaining environmental data may be interchanged based on a specific realization. Such variation will depend on the software and hardware systems chosen and on designer choice. All such variations are within the scope of the invention. Likewise, software implementations could be accomplished with standard programming techniques with rule-based logic and other logic to accomplish the various connection steps, processing steps, comparison steps and decision steps. The above mentioned and described embodiments are only given as examples and should not be limiting to the present invention. Other solutions, uses, objectives, and functions within the scope of the invention as claimed in the below described patent embodiments should be apparent for the person skilled in the art.

The invention claimed is:

1. A method for alerting drivers and/or autonomous vehicles of high risk scenarios, the method comprising:
   obtaining positional data of a vehicle, the positional data indicating a geographical position and a heading of the vehicle;
   obtaining environmental data of the vehicle, the environmental data indicating a state of the surrounding environment of the vehicle;
   determining, using a trained model, an accident intensity for an upcoming road portion for the vehicle, the trained model being configured to determine an accident intensity associated with the upcoming road portion based on the obtained environmental data and the obtained positional data;
   wherein the accident intensity is an intensity in a Poisson sense, and wherein the trained model is formed based on accident data from an accident database comprising information about a plurality of critical scenarios at a time of each critical scenario and data indicative of frequencies of similar situations as the critical scenarios, wherein the data indicative of frequencies of similar situations defines a number of attempts associated with each critical scenario; and
   responsive to the determined accident intensity exceeding a threshold, transmitting a signal indicating an approaching high risk scenario to a Human-Machine-Interface, HMI, of the vehicle and/or to a control system of the vehicle, wherein the signal indicating the approaching high risk scenario is transmitted to the control system of the vehicle to reduce a speed of the vehicle.

2. The method according to claim 1, wherein the data indicative of frequencies of measured similar situations as the critical scenarios is in the form of environmental data obtained over time from a plurality of vehicles in a fleet of vehicles.

3. The method according to claim 1, wherein the positional data of the vehicle is further indicative of an intended path of the vehicle.

4. The method according claim 1, wherein the environmental data is further indicative of a state of the vehicle.

5. The method according to claim 1, wherein the step of transmitting the signal indicating the approaching high risk scenario is transmitted to the HMI of the vehicle comprises:
   at an electronic device with a display:
   displaying on the display a user interface comprising:
   a graphical representation indicative of the exceeded threshold.

6. The method according to claim 1, wherein the signal indicating the approaching high risk scenario is transmitted to the control system of the vehicle in order to perform at least one of:
   generate a hand-over request;
   activate one or more ADS features;
   deactivate one or more ADS features;
      obtain a new candidate path for execution by an Automated Driving System, ADS, of the vehicle, wherein the new candidate path is configured to avoid the upcoming road portion.

7. A non-transitory computer-readable storage medium storing one or more instructions configured to be executed by one or more processors of a processing system, the one or more instructions for performing the method according to claim 1.

8. An apparatus for alerting drivers and/or autonomous vehicles of high risk scenarios, the apparatus comprising control circuitry configured to:
   obtain positional data of a vehicle, the positional data indicating a geographical position and a heading of the vehicle;
   obtain environmental data of the vehicle, the environmental data indicating a state of the surrounding environment of the vehicle;
   determine, by means of a trained model, an accident intensity for an upcoming road portion for the vehicle, the trained model being configured to determine an accident intensity associated with the upcoming road portion based on the obtained environmental data and the obtained positional data;
   wherein the accident intensity is an intensity in a Poisson sense, and wherein the trained model is formed based on accident data from an accident database comprising information about a plurality of critical scenarios at a time of each critical scenario and data indicative of frequencies of similar situations as the critical scenarios, wherein the data indicative of frequencies of similar situations defines a number of attempts associated with each critical scenario; and responsive to the determined accident intensity exceeding a threshold, transmit a signal indicating an approaching high risk scenario to a Human-Machine-Interface, HMI, of the vehicle and/or to a control system of the vehicle, wherein the signal indicating the approaching high risk scenario is transmitted to the control system of the vehicle to reduce a speed of the vehicle.

9. A vehicle comprising:

a localization system for generating positional data indicating a geographical location and a heading of the vehicle;

an apparatus for alerting drivers and/or autonomous vehicles of high risk scenarios, the apparatus comprising control circuitry configured to:

obtain positional data of a vehicle, the positional data indicating a geographical position and a heading of the vehicle;

obtain environmental data of the vehicle, the environmental data indicating a state of the surrounding environment of the vehicle;

determine, by means of a trained model, an accident intensity for an upcoming road portion for the vehicle, the trained model being configured to determine an accident intensity associated with the upcoming road portion based on the obtained environmental data and the obtained positional data;

wherein the accident intensity is an intensity in a Poisson sense, and wherein the trained model is formed based on accident data from an accident database comprising information about a plurality of critical scenarios at a time of each critical scenario and data indicative of frequencies of similar situations as the critical scenarios, wherein the data indicative of frequencies of similar situations defines a number of attempts associated with each critical scenario; and responsive to the determined accident intensity exceeding a threshold, transmit a signal indicating an approaching high risk scenario to a Human-Machine-Interface, HMI, of the vehicle and/or to a control system of the vehicle, wherein the signal indicating the approaching high risk scenario is transmitted to the control system of the vehicle to reduce a speed of the vehicle.

* * * * *